March 14, 1950 Q. A. KERNS 2,500,756
RECTANGULAR PULSE AMPLIFIER
Filed March 1, 1948
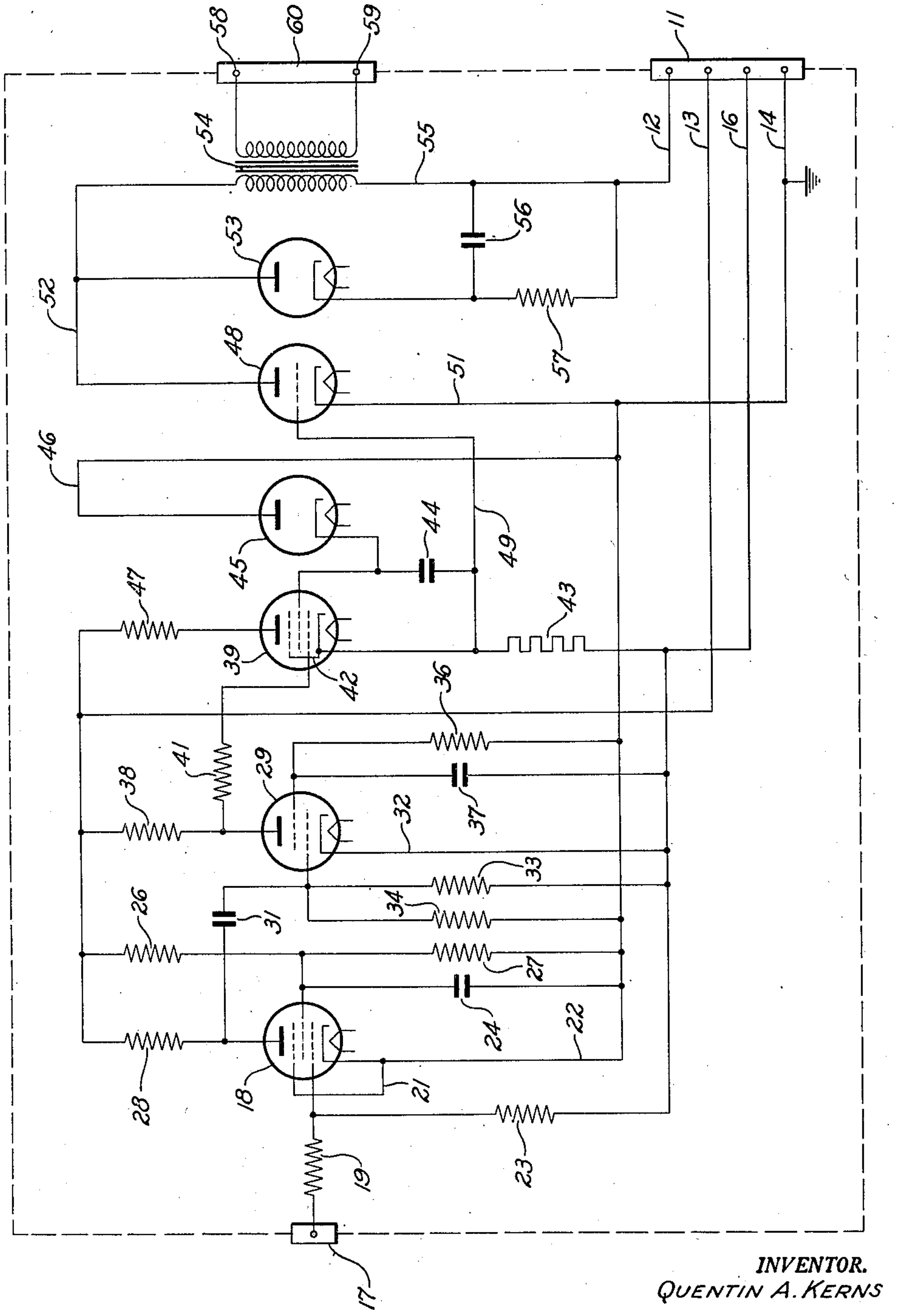
INVENTOR.
QUENTIN A. KERNS
BY Roland A. Anderson
ATTORNEY.

Patented Mar. 14, 1950 2,500,756

UNITED STATES PATENT OFFICE 2,500,756

RECTANGULAR PULSE AMPLIFIER

Quentin A. Kerns, Berkeley, Calif., assignor to the United States of America as represented by the United States Atomic Energy Commission Application March 1, 1948, Serial No. 12,356

5 Claims. (Cl. 179—171)

This invention relates to a power amplifier circuit and more particularly to a power amplifier for passing rectangular waves of voltage without distortion.

In known power amplifiers, it has been found that the reproduction from input to output of rectangular voltage waves is very poor; that is, the circuit elements introduce instability and small deformations at the input circuit are magnified to the output to round off the corners of the voltage wave and introduce ripples in the maximum value. These difficulties are eliminated in the present invention by carefully controlling the operating voltages at the circuit elements and by the addition of circuits in the output stage to sharpen the corners and remove any ripples from the output rectangular voltage wave.

It is therefore an object of this invention to provide a new and improved power amplifier circuit.

Another object of the invention is to provide a circuit adapted to amplify rectangular pulses of voltage with a minimum amount of distortion.

A further object of this invention is to provide a power amplifier circuit having an output circuit adapted to damp transient voltages in the output circuit due to inductance.

A still further object of this invention is to provide an electronic coupling circuit wherein the screen grid of the tube is maintained at a constant potential above the cathode.

Other objects and advantages of the invention will be apparent in the following description and claims considered together with the accompanying drawing which is a schematic wiring diagram embodying the invention and is the sole drawing thereof.

Referring to the drawing in detail, an input plug 11 furnishes the circuit with a high positive voltage 12 (approximately +5000 volts), a medium positive voltage 13 (approximately +400 volts), a neutral connection 14 which is grounded, and a negative voltage 16 (approximately —400 volts).

A second input plug 17 is connected to the control grid of a pentode tube 18 through a resistor 19. Other connections of the tube 18 are as follows: the cathode is connected to the suppressor grid by a lead 21 and to the neutral connection 14 by a lead 22, the control grid is connected to the negative voltage 16 through a resistor 23, the screen grid is connected to the neutral connection 14 through a by-pass condenser 24 and to the junction of two resistors 26 and 27 which divide the voltage between the positive voltage 13 and the neutral connection 14, and the anode is connected to the positive voltage 13 through a dropping resistor 28. The anode of this tube 18 is further connected to the control grid of a tetrode type beam power tube 29 through a coupling condenser 31. The tube 29 is further connected as follows: the cathode is connected to the negative voltage 16 by a lead 32, the control grid is connected to the junction between two resistors 33 and 34 of a voltage divider between the negative voltage 16 and the neutral connection 14, the screen grid is connected to the neutral connection 14 through a biasing resistor 36 and to the negative voltage 16 through a by-pass condenser 37, and the anode is connected to the positive voltage 13 through a dropping resistor 38. The anode of the tube 29 is further connected to the control grid of a pentode type coupling tube 39 through a limiting resistor 41. Further connections of this tube 39 are as follows: the cathode is connected to the suppressor grid by a lead 42 and to the negative voltage 16 through a non-inductive resistor 43; the screen grid is connected to the cathode through a condenser 44 and to the cathode of a diode type tube 45, the anode of which is connected to the neutral connection 14 by a lead 46; and the anode is connected to the positive voltage 13 through an anode resistor 47. The cathode of the tube 39 is further connected to the control grid of a triode type driver-amplifier tube 48 by a lead 49. A lead 51 is connected from the cathode of the tube 48 to the neutral connection 14. The anode of the tube 48 is connected, by a lead 52, to the anode of a diode type tube 53 and to one terminal of the primary winding of an output transformer 54. The second terminal of the primary winding of the output transformer 54 is connected, by a lead 55, to the cathode of the tube 53 through a parallel circuit comprising a condenser 56 and a resistor 57, and further to the high voltage 12. The terminals of the secondary winding of the output transformer 54 are connected to output terminals 58 and 59 of an output plug 60.

Now consider the operation of the invention with the plug 11 so connected to a suitable source of direct current that the required operating voltages are impressed on the tubes 18, 29, 39, 45, 48, and 53. Under this condition the circuit is operable to amplify voltages appearing at the input plug 17. Since the circuit has been designed for the purpose of amplifying rectangular pulses of voltage, the following description will be confined to this operation. A positive rectangular pulse of voltage impressed at the input plug 17 results in a positive voltage at the control grid of the tube 18 which then becomes conductive. The tube 18 is normally non-conductive by reason of the negative control grid to cathode voltage impressed from the negative voltage 16. Since the tube 18 conducts for the duration of the input pulse of rectangular voltage, a voltage drop occurs across the anode dropping resistor 28 for a like period, thereby lowering the anode voltage and impressing a negative rectangular pulse of voltage on the control grid of the beam power type tube 29 through the coupling condenser 31. In this first stage of the circuit care is taken to eliminate distortion by control of the screen grid voltage of the tube 18. This is accomplished with the by-pass condenser 24 which grounds any alternating components of the voltage present at the screen grid, thereby maintaining the voltage substantially constant. It is also to be noted that the combination of the resistors 28, 33, and 34 and the condenser 31 have a filtering effect to remove ripple voltages which are inherent in ordinary power supplies.

The tube 29 is so connected that the anode is negative, the control grid more negative, and the cathode still more negative; therefore, the tube is normally conductive with a maximum amount of current flowing. Now, with a negative rectangular pulse of voltage impressed at the control grid, the tube ceases to conduct and the anode voltage becomes substantially that of the positive voltage 13. This positive voltage at the anode of the tube 29 remains for the duration of the negative rectangular pulse applied to the control grid, thereby reproducing an amplified image of the input pulse of voltage.

The coupling tube 39 is connected in the form of a cathode follower and its control grid voltage is obtained directly from the anode of the tube 29. This means that the tube 39 is normally non-conductive and becomes conductive only during the time that the anode of the tube 29 is sufficiently positive to overcome the negative cathode bias voltage, which time occurs coincident with the input pulse of voltage. The cathode of this tube 39 therefore furnishes a positive pulse of voltage to the control grid of the driver-amplifier tube 48. It is to be noted that connections have been made in the screen grid circuit of the tube 39 to maintain the screen grid at a constant potential above the cathode at all times, eliminating a source of distortion in the amplifier circuit. The referenced connections are the condenser 44 and the diode tube 45 which are connected in series from the cathode of the tube 39 to the neutral connection 14 with the screen grid connected to the junction between them, thus isolating the screen grid from direct connection to the power supply. Since the anode of the tube 45 is directly connected to the neutral connection 14 and the cathode is connected to the negative voltage 16 through the condenser 44 and the resistor 43, the condenser is charged during the time the tube 39 is non-conductive, thereby placing a positive potential on the screen grid. When a positive pulse of voltage appears across the resistor 43, the voltage pulse is applied to the screen grid of the tube 39 through the condenser 44, raising the potential of the screen grid and maintaining the screen grid to cathode voltage constant. The value of the capacitance of the condenser 44 is so chosen that the desired voltage can be maintained for the duration of the pulse of voltage.

As stated previously a positive rectangular pulse of voltage is impressed from the cathode of the tube 39 on the control grid of the tube 48. This latter tube 48 is normally non-conductive because of the negative bias voltage furnished the control grid across the resistor 43. Thus at the time the positive rectangular pulse of voltage appears at the control grid of the tube 48, the tube conducts and draws maximum current through the primary winding of the output transformer 54. This output transformer 54 is of a pulse type having a low value of leakage reactance. The voltage developed across the primary winding of the transformer 54 is a negative rectangular pulse which is transformed into a positive rectangular pulse of voltage across the secondary winding of the transformer 54 and therefore across the two output terminals 58 and 59. Even though the transformer 54 is a low leakage reactance type, there is still sufficient leakage reactance to cause transient voltages in the output. To damp the transient positive swing of the voltage at the end of the voltage pulse the circuit comprising the diode tube 53 and the parallel-connected resistor 57 and condenser 56 have been added. The tube 53 and the condenser 56 are connected in series across the primary winding of the transformer 54 with the anode of the tube 53 connected to the anode of the tube 48. Thus, during the negative pulse of voltage at the anode of the tube 48, the anode of the tube 53 is more negative than the cathode and the diode cannot fire. However, as stated above, when the voltage returns from its low value to its normal value, the leakage reactance causes the voltage to build up to a value higher than the normal value, which portion of the voltage causes the anode of the tube 53 to become more positive than the cathode resulting in the tube drawing current, thereby charging the condenser 56. The condenser 56 then discharges through the resistor 57 during the period between pulses. Thus, distortion of the output voltage is prevented.

While the salient features of this invention have been described in detail with respect to one embodiment, it will, of course, be apparent that numerous modifications may be made within the spirit and scope of this invention, and it is therefore not desired to limit the invention to the exact details shown except insofar as they may be defined in the specification and in the following claims.

What is claimed is:

1. In an electronic coupling circuit the combination comprising an electron tube having at least a cathode, a control grid, a screen grid, and an anode, means for impressing a negative voltage at said cathode and a positive voltage at said anode, a condenser for coupling said cathode to said screen grid, and a diode tube having its anode connected to a neutral point and its cathode connected to said screen grid whereby said screen grid is maintained at a constant potential above the cathode of said electron tube.

2. In an amplifier for rectangular voltage pulses, the combination comprising an amplifier circuit having at least two stages of amplification, a driver-amplifier circuit, a cathode-follower tube having at least a cathode, control grid, screen grid, and anode, said control grid being connected to the output of said amplifier circuit, said cathode being connected to the input of said driver-amplifier, means for biasing said anode positively and said cathode negatively, a condenser connected between said cathode and said screen grid for maintaining a constant cathode to screen grid bias, a diode tube having its anode connected to a neutral point of said biasing means and its cathode connected to said screen grid for furnishing a charging path for said condenser, and means connected to the output of said driver-amplifier for damping transient voltages.

3. In an amplifier for rectangular voltage pulses, the combination comprising an amplifier circuit having at least two stages of amplification, a driver-amplifier circuit, a cathode-follower tube having at least a cathode, control grid, screen grid, and anode, said control grid being connected to the output of said amplifier circuit, said cathode being connected to the input of said driver-amplifier, means for biasing said anode positively and said cathode negatively, a condenser connected between said cathode and said screen grid for maintaining a constant cathode to screen grid bias, a diode tube having its anode connected to a neutral point of said biasing means and its cathode connected to said screen grid for furnishing a charging path for said condenser, an output transformer connected across the output of said driver-amplifier, means for supplying a bias voltage to said driver-amplifier through the primary winding of said transformer, a diode tube having its anode connected to one side of the primary winding of said transformer and its cathode connected to the other said of said primary winding through a condenser, and a resistor connected across said condenser for discharging said condenser.

4. In an electronic coupling circuit, the combination comprising an electron tube having at least a cathode, a control grid, a screen grid, and an anode, means for impressing a negative voltage at said cathode and a positive voltage at said anode, a condenser for coupling said cathode to said screen grid, and rectifier means connected between said screen grid and a neutral point for furnishing a charging path for said condenser whereby said screen grid is maintained at a constant potential above said cathode.

5. In an electronic coupling circuit, the combination comprising an electron tube having at least a cathode, a control grid, a screen grid, and an anode, a voltage source having a positive terminal, a negative terminal, and an intermediate neutral terminal, a dropping resistor connected between said anode and said positive terminal, a cathode resistor connected between said cathode and said negative terminal, a condenser connected between said cathode and said screen grid, and rectifier means connected between said screen grid and said neutral terminal to form a charging path for said condenser.

QUENTIN A. KERNS.

REFERENCES CITED

The following references are of record in the file of this patent:

UNITED STATES PATENTS

| Number | Name | Date |
|---|---|---|
| 2,149,361 | Rath | Mar. 7, 1939 |
| 2,178,985 | Blumlein | Nov. 7, 1939 |
| 2,273,934 | Campbell | Feb. 24, 1942 |
| 2,390,503 | Atkins | Dec. 11, 1945 |
| 2,423,671 | Wolff | July 8, 1947 |
| 2,444,854 | Schlesinger | July 6, 1948 |